US012793482B2

(12) United States Patent
Petersson et al.

(10) Patent No.: US 12,793,482 B2
(45) Date of Patent: Nov. 10, 2026

(54) METHODS AND SYSTEMS FOR SETTING DYNAMIC TRIGGERS FOR EVENT RECORDINGS FOR A VEHICLE

(71) Applicant: ZENSEACT AB, Gothenburg (SE)

(72) Inventors: Christoffer Petersson, Västra Frölunda (SE); Thomas Luvö, Stenkullen (SE); Adam Tonderski, Gothenburg (SE); Georg Hess, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 28 days.

(21) Appl. No.: 18/988,784

(22) Filed: Dec. 19, 2024

(65) Prior Publication Data

US 2025/0209872 A1 Jun. 26, 2025

(30) Foreign Application Priority Data

Dec. 20, 2023 (EP) .................................... 23218795

(51) Int. Cl.
*G07C 5/08* (2006.01)
*G06F 16/22* (2019.01)
*G07C 5/00* (2006.01)

(52) U.S. Cl.
CPC ......... *G07C 5/085* (2013.01); *G06F 16/2237* (2019.01); *G06F 16/2264* (2019.01); *G07C 5/008* (2013.01)

(58) Field of Classification Search
CPC ...... G07C 5/085; G07C 5/008; G07C 5/0841; G07C 5/0808; G06F 16/2237; G06F 16/2264; G06F 16/258; G08G 1/0129; G08G 1/0112; G08G 1/0145
See application file for complete search history.

(56) References Cited

U.S. PATENT DOCUMENTS

| | | | | |
|---|---|---|---|---|
| 11,372,851 | B2 * | 6/2022 | Johnson | G06F 16/2425 |
| 11,620,838 | B2 | 4/2023 | Segal et al. | |
| 12,340,350 | B2 * | 6/2025 | Fowler | G06K 7/10297 |
| 2013/0332004 | A1 * | 12/2013 | Gompert | G06F 16/73 701/1 |
| 2018/0232964 | A1 * | 8/2018 | Chen | G07C 5/008 |
| 2019/0236167 | A1 | 8/2019 | Hu et al. | |
| 2019/0258954 | A1 * | 8/2019 | Daly | G06F 16/2358 |
| 2020/0193736 | A1 * | 6/2020 | Lawrence | G07C 5/085 |
| 2020/0250901 | A1 * | 8/2020 | Golov | B60R 21/0134 |
| 2020/0320084 | A1 * | 10/2020 | Goto | G06F 16/24568 |
| 2021/0056783 | A1 * | 2/2021 | Harris | G08G 1/0112 |
| 2021/0406262 | A1 * | 12/2021 | Unnikrishnan | G06F 16/2462 |

(Continued)

OTHER PUBLICATIONS

Extended European Search Report mailed Jul. 24, 2024 for European Patent Application No. 23218795.5, 9 pages.

*Primary Examiner* — Mussa A Shaawat
(74) *Attorney, Agent, or Firm* — Sage Patent Group

(57) ABSTRACT

A method for setting dynamic triggers for event recordings for a vehicle and related aspects are disclosed. The method includes obtaining sensor data samples captured by one or more sensors of the vehicle, generating sensor data embeddings from the sensor data samples, receiving a query embedding, identifying one or more sensor data embeddings within the multi-dimensional vector space based on a proximity to the received query embedding within the multi-dimensional vector space, and storing sensor data samples represented by the identified one or more sensor data embeddings.

10 Claims, 3 Drawing Sheets

(56) References Cited

U.S. PATENT DOCUMENTS

| | | | | |
|---|---|---|---|---|
| 2022/0126864 | A1* | 4/2022 | Moustafa | B60W 60/0013 |
| 2022/0164350 | A1* | 5/2022 | Gao | G06F 30/27 |
| 2023/0035340 | A1* | 2/2023 | Rose | G08G 1/0145 |
| 2023/0161808 | A1 | 5/2023 | Bursztyn et al. | |
| 2023/0221923 | A1* | 7/2023 | Schneider | G06F 16/907<br>702/189 |
| 2023/0290199 | A1* | 9/2023 | Gyllenhammar | G07C 5/085 |
| 2023/0412620 | A1* | 12/2023 | Crabtree | H04L 41/12 |
| 2024/0210203 | A1* | 6/2024 | Williamson | G01C 21/3815 |

* cited by examiner

METHODS AND SYSTEMS FOR SETTING DYNAMIC TRIGGERS FOR EVENT RECORDINGS FOR A VEHICLE

CROSS-REFERENCE TO RELATED APPLICATIONS

The present application for patent claims priority to European Patent Office Application Ser. No. 23218795.5, entitled "METHODS AND SYSTEMS FOR SETTING DYNAMIC TRIGGERS FOR EVENT RECORDINGS FOR A VEHICLE" filed on Dec. 20, 2023, assigned to the assignee hereof, and expressly incorporated herein by reference.

TECHNICAL FIELD

The herein disclosed technology relates to methods and systems for setting dynamic triggers for event recordings for a vehicle. In particular, but not exclusively, the herein disclosed technology relates to methods and system for improving the capability to trigger vehicles to collect sensor data samples of value for development, testing or verification of Automated Driving Systems.

BACKGROUND

Vehicles which are equipped with an advanced driver-assistance systems (ADASs) and/or autonomous driving (AD) systems, collectively referred to herein as Automated Driving Systems (ADSs), generate huge amounts of sensor-related data as they are driven around. Data from real-life scenarios is critical in a data-driven development organisation where the ADS performance scales with amount of data collected. Current ADS solutions often rely upon data servers containing sensor data from a small amount of dedicated test vehicles collected in a limited time frame. These data collections therefore contain a very limited number of scenarios, and with ADS features continuously being developed and updated through Over-The-Air (OTA) updates, it is difficult to maintain adequate performance over time. Thus, it is envisioned that the next-generation of ADS solutions will be leveraged by continuously collecting data from the production fleet.

However, accessing the data from an entire fleet of vehicles (i.e. production vehicles or customer vehicles) and transmitting the data to a centralized server is very costly and technically challenging due to storage limitations, bandwidth limitations, and the immense need of post-processing to extract the relevant datasets for each individual use-case.

SUMMARY

The herein disclosed technology seeks to mitigate, alleviate or eliminate one or more of the above-identified deficiencies and disadvantages in the prior art to address various problems relating to relating technical constrictions (bandwidth limitations, storage limitations, etc.) for collecting data from a fleet of ADS equipped vehicles for evaluating and improving the performance of the ADS.

Various aspects and embodiments of the disclosed technology are defined below and in the accompanying independent and dependent claims.

A first aspect of the disclosed technology comprises a method for setting dynamic triggers for event recordings for a vehicle. The method comprises obtaining sensor data samples captured by one or more sensors of the vehicle, and generating sensor data embeddings from the sensor data samples. Here, the sensor data embeddings are generated by processing each sensor data sample through one or more sensor data embedding networks that have been trained to process sensor data samples and to output a corresponding sensor data embedding for each sensor data sample in a multi-dimensional vector space. Further, the method comprises receiving a query embedding, where the query embedding has been generated by processing a query through one or more query embedding networks that have been trained to process queries and to output a corresponding query embedding for each query in the multi-dimensional vector space. Moreover, each of the one or more query embedding networks has been trained in association with one or more of the sensor data embedding networks such that a query embedding of a query that is contextually related to a specific sensor data sample points towards the same point as the sensor data embedding of that sensor data sample within the multi-dimensional vector space. The method further comprises identifying one or more sensor data embeddings within the multi-dimensional vector space based on a proximity to the received query embedding within the multi-dimensional vector space, and storing sensor data samples represented by the identified one or more sensor data embeddings.

A second aspect of the disclosed technology comprises a computer program product comprising instructions which, when the program is executed by a computing device, causes the computing device to carry out the method according to any one of the embodiments of the first aspect disclosed herein. With this aspect of the disclosed technology, similar advantages and preferred features are present as in the other aspects.

A third aspect of the disclosed technology comprises a (non-transitory) computer-readable storage medium comprising instructions which, when executed by a computing device, causes the computing device to carry out the method according to any one of the embodiments of the first aspect disclosed herein. With this aspect of the disclosed technology, similar advantages and preferred features are present as in the other aspects.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

A fourth aspect of the disclosed technology comprises a system for setting dynamic triggers for event recordings for a vehicle. The system comprises control circuitry configured to obtain sensor data samples captured by one or more sensors of the vehicle, and generate sensor data embeddings from the sensor data samples. Here, the sensor data embeddings are generated by processing each sensor data sample through one or more sensor data embedding networks that have been trained to process sensor data samples and to output a corresponding sensor data embedding for each sensor data sample in a multi-dimensional vector space. The control circuitry is further configured to receive a query embedding, where the query embedding has been generated by processing a query through one or more query embedding networks that have been trained to process queries and to output a corresponding query embedding for each query in the multi-dimensional vector space. Moreover, each of the one or more query embedding networks has been trained in association with one or more of the sensor data embedding networks such that a query embedding of a query that is contextually related to a specific sensor data sample points towards the same point as the sensor data embedding of that sensor data sample within the multi-dimensional vector space. The control circuitry is further configured to identify one or more sensor data embeddings within the multi-dimensional vector space based on a proximity to the received query embedding within the multi-dimensional vector space, and store sensor data samples represented by the identified one or more sensor data embeddings. With this aspect of the disclosed technology, similar advantages and preferred features are present as in the other aspects.

A fifth aspect of the disclosed technology comprises a vehicle comprising a system for setting dynamic triggers for event recordings for a vehicle in accordance with any one of the embodiments disclosed herein. With this aspect of the disclosed technology, similar advantages and preferred features are present as in the other aspects.

The disclosed aspects and preferred embodiments may be suitably combined with each other in any manner apparent to anyone of ordinary skill in the art, such that one or more features or embodiments disclosed in relation to one aspect may also be considered to be disclosed in relation to another aspect or embodiment of another aspect.

An advantage of some embodiments is that collection of data from ADS equipped vehicles is rendered more efficient and cost effective.

An advantage of some embodiments is that a vehicle may be dynamically triggered in real-time to collect data of specific scenarios for facilitating testing and development of ADS functions.

An advantage of some embodiments that text-based or image-based queries can be used for triggering a vehicle to collect data of specific scenarios for facilitating testing and development of ADS functions.

An advantage of some embodiments is that insight into the fleet of ADS equipped vehicles is enabled with efficient utilization of processing, memory and transmission resources.

An advantage of some embodiments is that one no longer has to rely on special-purpose test vehicles to gain insight into the workings of the ADS since data collection from a large vehicle fleet (i.e. production fleet) is rendered possible.

An advantage of some embodiments is that the data collection can be tailored to specific needs depending on the geographical extension of the fleet or current data need in a rapid fashion providing a more versatile tool for collecting high volumes of relevant data from ADS equipped vehicles.

An advantage of some embodiments is that faster releases of more performant and safer ADS functions are possible as compared to prior known solutions.

Further embodiments are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the disclosed technology will in the following be further clarified with reference to the embodiments described hereinafter.

BRIEF DESCRIPTION OF THE DRAWINGS

The above aspects, features and advantages of the disclosed technology, will be more fully appreciated by reference to the following illustrative and non-limiting detailed description of example embodiments of the present disclosure, when taken in conjunction with the accompanying drawings, in which.

DETAILED DESCRIPTION

Figure 1:
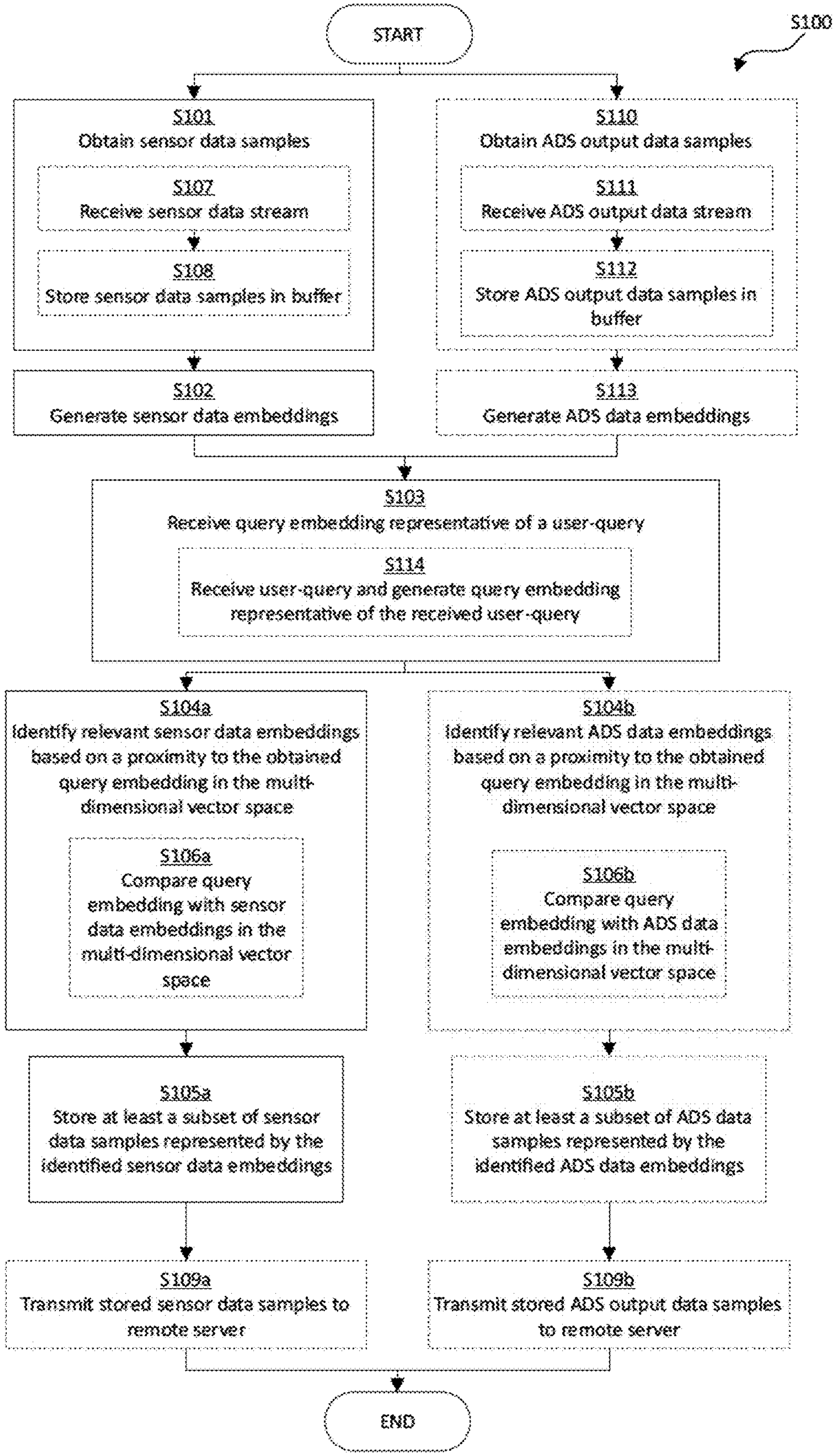
FIG. 1 is a schematic flowchart representation of a method for setting dynamic triggers for event recordings for a vehicle in accordance with some embodiments.

The present disclosure will now be described in detail with reference to the accompanying drawings, in which some example embodiments of the disclosed technology are shown. The disclosed technology may, however, be embodied in other forms and should not be construed as limited to the disclosed example embodiments. The disclosed example embodiments are provided to fully convey the scope of the disclosed technology to the skilled person. Those skilled in the art will appreciate that the steps, services and functions explained herein may be implemented using individual hardware circuitry, using software functioning in conjunction with a programmed microprocessor or general-purpose computer, using one or more Application Specific Integrated Circuits (ASICs), using one or more Field Programmable Gate Arrays (FPGA) and/or using one or more Digital Signal Processors (DSPs).

It will also be appreciated that when the present disclosure is described in terms of a method, it may also be embodied in apparatus comprising one or more processors, one or more memories coupled to the one or more processors, where computer code is loaded to implement the method. For example, the one or more memories may store one or more computer programs that causes the apparatus to perform the steps, services and functions disclosed herein when executed by the one or more processors in some embodiments.

It is also to be understood that the terminology used herein is for purpose of describing particular embodiments only, and is not intended to be limiting. It should be noted that, as used in the specification and the appended claim, the articles "a", "an", "the", and "said" are intended to mean that there are one or more of the elements unless the context clearly dictates otherwise. Thus, for example, reference to "a unit" or "the unit" may refer to more than one unit in some contexts, and the like. Furthermore, the words "comprising", "including", "containing" do not exclude other elements or steps. It should be emphasized that the term "comprises/comprising" when used in this specification is taken to specify the presence of stated features, integers, steps, or components. It does not preclude the presence or addition of one or more other features, integers, steps, components, or groups thereof. The term "and/or" is to be interpreted as meaning "both" as well and each as an alternative.

It will also be understood that, although the term first, second, etc. may be used herein to describe various elements or features, these elements should not be limited by these terms. These terms are only used to distinguish one element from another. For example, a first signal could be termed a second signal, and, similarly, a second signal could be termed a first signal, without departing from the scope of the embodiments. The first signal and the second signal are both signals, but they are not the same signal.

An imperative aspect of achieving reliable Automated Driving System (ADS) functionality for the vehicles of tomorrow is to obtain a comprehensive understanding of the scenarios occurring in the surrounding environment of the vehicle. The unpredictable and dynamic scenarios including situations, events or objects in the surrounding environment of the vehicle and on the roads on which the vehicle is travelling can involve nearly endless varieties and complexities. In other words, there is a need for immense amounts of data (sensor data logged by vehicles) for achieving reliable autonomous functionality.

However, some of the challenges with collecting data from a fleet of vehicles for the purpose of testing, developing, and verifying ADS functions is that simply transmitting all of the data is unfeasible due to the immense need of bandwidth and transmission resources, and also due to the insurmountable post-processing task required to extract relevant data samples. Thus, it is desirable to be able to configure the vehicles (or more precisely the ADS of the vehicles) to trigger data recordings of specific scenarios or events experienced by the ADS. This on the other hand comes with its own challenges in that it may be difficult to preconfigure the data recording triggers during design-time, and perhaps even more difficult, to configure data recording triggers on feature events that are outside of the current feature stack of the ADS. Various aspects and embodiments disclosed herein aim to provide a solution to easily, and dynamically, trigger data recordings in the vehicle and to enable for using free-text, image, and/or video queries for setting those triggers for data recording.

To this end, the herein disclosed technology proposes the use of embeddings, which is a technique to express information as vectors, in something one can call a data space or vector space, and to identify relevant data samples based on a similarity between embeddings. In short, it is herein proposed to utilize embedding networks (artificial neural networks trained to generate an embedding in the data space representative of its input) on the vehicle's sensor data (sensor output), and optionally on the ADS's output and to integrate these networks directly in the sensor stream, and optionally on the ADS output stream.

Moreover, the herein disclosed technology proposes to train the embedding networks by having one "base" embedding network, and then training the other embedding networks against the "base" network by reusing the input samples and output embeddings of the "base" network in the training process of the other embedding networks. In particular, the embedding network that is used to generate query embeddings from user queries is trained against the "base" network so that the query embeddings generated by the query embedding network to match the sensor data embeddings generated by the "base" network.

Accordingly, in use, a user creates a query (e.g., text, image, and/or video query) that is processed by a query embedding network that outputs a corresponding query embedding that is downloaded to one or more vehicles. The vehicles on the other hand, generate sensor data embeddings continuously by processing the output from one or more sensors through one or more corresponding sensor data embedding networks. The continuously generated sensor data embeddings are then compared against the downloaded query embedding in the common vector space in order to identify matching or otherwise relevant (e.g., embeddings exceeding a similarity score threshold) sensor data embeddings. The identified sensor data embeddings are all linked to the specific sensor data samples that resulted in those embeddings whereupon these sensor samples are stored in a data repository of a vehicle for subsequent transmission to the "cloud" or to be downloaded during e.g., a workshop visit. As mentioned in the foregoing, the vehicles may comprise multiple embedding networks for generating embeddings for the output of other data sources. Thereby providing a solution for querying vehicles, using free-text, images, and/or videos, in real-time for collection of specific data samples.

As used herein, the term "in response to" may be construed to mean "when or "upon" or "if" depending on the context. Similarly, the phrase "in response to fulfilment of a condition" may be construed to mean "when it is determined that a condition is fulfilled" or "in an instance of fulfilment of a condition" "upon determining a fulfilment of a condition" or "upon detecting and identifying occurrence of an event fulfilling a condition" or "in response to detecting occurrence of an event fulfilling a condition", depending on the context.

In the present context, an "Automated Driving System" ("ADS") refers to a complex combination of hardware and software components designed to control and operate a vehicle without direct human intervention. ADS technology aims to automate various aspects of driving, such as steering, acceleration, deceleration, and monitoring of the surrounding environment. The primary goal of an ADS is to enhance safety, efficiency, and convenience in transportation. An ADS can range from basic driver assistance systems to highly advanced autonomous driving systems, depending on its level of automation, as classified by standards like the SAE J3016. These systems use a variety of sensors, cameras, radar, lidar, and powerful computer algorithms to perceive the environment and make driving decisions. The specific capabilities and features/functions of an ADS can vary widely, from systems that provide limited assistance to those that can handle complex driving tasks independently in specific conditions.

Advanced Driver Assistance Systems (ADAS) are technologies that assist drivers in the driving process, though they do not necessarily offer full autonomy. ADAS features often serve as building blocks for ADS. Examples include adaptive cruise control, lane-keeping assist, automatic emergency braking, and parking assistance. They enhance safety and convenience but typically require some level of human supervision and intervention. On the other hand, Autonomous Driving (AD) are technologies that are designed to control and navigate a vehicle without human supervision. Accordingly, it can be said that distinction between ADAS and AD lies in the level of autonomy and control. ADAS systems are designed to aid and support drivers, while an AD aims to take full control of the vehicle without requiring constant human oversight. AD accordingly aims for higher levels of autonomy (such as Levels 4 and 5, according to the SAE International standard), where the vehicle can operate independently in most or all driving scenarios without human intervention. As mentioned in the foregoing, the term “ADS” in used herein as an umbrella term encompassing both ADAS and AD. An ADS function or ADS feature may in the present context be understood as a specific function or feature of the entire ADS stack, such as e.g., a Highway Pilot feature, a Traffic-Jam pilot feature, a path planning feature, and so forth.

The term “perception data” refers to the information gathered by sensors and other technologies that are used by ADS-equipped vehicles to detect and interpret their environment. This includes data collected from cameras, lidar, radar, and other sensors that help the vehicle “perceive” its surroundings and make decisions based on that information. The perception data collected by the vehicle may include the position, speed, and direction of nearby objects, position and type of road markings, position and type of traffic signs, and other relevant information. This data may then be processed by the vehicle’s onboard computer to help it make decisions on steering, acceleration, braking, and other actions necessary to safely navigate the environment. Accordingly, the term “perception” data may refer to “surroundings assessment” data, “spatial perception” data, “processed sensory” data and/or “temporal dependencies” data, whereas perception “data” may refer to perception “information” and/or “estimates”. The term “obtained” from a perception module or perception system, on the other hand, may refer to “derived” from a perception model and/or “based on output data” from a perception module or system. whereas perception module/system configured to “generate the set of perception data” may refer to perception module/system adapted and/or configured to “estimate the surroundings of said vehicle”, “estimate at least a portion of surroundings of said vehicle”, “determine surroundings of said vehicle”, “interpret sensory information relevant for the autonomous manoeuvring of said vehicle”, and/or “estimate surroundings of said vehicle and make model predictions of future states of the surroundings of said vehicle”.

In the present context, a “sensor” or “sensor device” or “sensor” refers to a specialized component or system that is designed to capture and gather information from the vehicle’s surroundings. These sensors play a crucial role in enabling the ADS to perceive and understand their environment, make informed decisions, and navigate safely. Sensors are typically integrated into the autonomous vehicle’s hardware and software systems to provide real-time data for various tasks such as obstacle detection, localization, road model estimation, and object recognition. Common types of sensors used in autonomous driving include LiDAR (Light Detection and Ranging), Radar, Cameras, and Ultrasonic sensors. LiDAR sensors use laser beams to measure distances and create high-resolution 3D maps of the vehicle’s surroundings. Radar sensors use radio waves to determine the distance and relative speed of objects around the vehicle. Camera sensors capture visual data, allowing the vehicle’s computer system to recognize traffic signs, lane markings, pedestrians, and other vehicles. Ultrasonic sensors use sound waves to measure proximity to objects. Various machine learning algorithms (such as e.g., artificial neural networks) may be employed to process the output from the sensors to make sense of the environment.

A driver monitoring system (DMS) can be understood as a system comprising one or more cameras focused on a driver of the vehicle in order to capture images of the driver’s face so to determine various facial characteristics of the driver including the position, orientation, and movement of the driver’s eyes, face and head. Moreover, the DMS may be further configured to derive a state of the driver based on the determined facial characteristics, such as e.g., if the driver is in an attentive or inattentive state, if the driver is tired, if the driver is drowsy, and so forth.

In the present context, the term “data sample” refers to a subset of data taken from a larger dataset or data stream. In particular, the “data samples” may be collected by sampling data output by a sensor of the vehicle or other sources (e.g., outputs from various functions of the ADS). The data may be sampled with a suitable sample rate given the size of dataset. For example, the data may be sampled with 0.1 second intervals, 0.5 second intervals, 1 second intervals, or the like. In some examples, the data samples include “sensor data samples” and “ADS output data samples”.

The term “sensor data sample” may be interpreted as a specific instance or set of data collected by the sensors installed on the ADS-equipped vehicles at a particular moment in time or within a specific timeframe. The sensor data samples typically comprise various types of information captured by the sensors, such as camera images, lidar output, radar output, GPS coordinates, accelerometer readings, and other sensor-generated data. The “sensor data samples” may include connected meta data (e.g., timestamps, location information, vehicle information, log duration, etc.).

The term “ADS output data samples” may be interpreted as data sampled from “downstream functions” of the ADS. In other words, data sampled from the output of various functions of the ADS such as e.g., path planning functions, perception functions, trajectory planning functions, road model generation functions, object tracking functions, safety functions, and so forth. Each of these examples ADS functions ingest and process sensor output, hence they may be referred to as “downstream functions” as they are downstream from the sensor output in the ADS software stack. In more detail, the ADS data samples may for example include perception output (e.g., object detections, semantic segmentations, detected lane markings, detected lanes, object classifications, free-space estimations, etc.), path planning output (e.g., candidate paths, executed paths, etc.), trajectory planning output (e.g., candidate trajectories, executed trajectories, etc.), safety function output (e.g., Minimum Risk Manoeuvre (MRM) execution, collision avoidance execution, etc.) hardware error logs, software error logs, and so forth.

The term “embedding network” (“embedding neural network” or “embedding artificial neural network”) refers to a computational model or set of techniques that are used to enable a computer to generate an embedding for an input data sample, where an “embedding” may be understood as a mathematical representation of data. In more detail, the “embedding network” is used to transform high-dimensional data into a lower-dimensional space (multi-dimensional vector space) while preserving meaningful relationships between the input data points.

Embedding networks are for example used for tasks like natural language processing (NLP) and computer vision. These networks take raw input data, such as words in a sentence or images, and convert them into fixed-size, numerical vectors (embeddings) that capture essential characteristics or features of the input data. In more detail, in NLP, the embedding networks convert words into numerical vectors, where words with similar meanings or contextual usage are represented closer to each other in the embedding space (multi-dimensional vector space). Similarly, in computer vision, the embedding networks convert images to numerical vectors, enabling the network to understand visual similarities, like grouping similar objects or scenes closer together in the embedding space (multi-dimensional vector space).

Neural networks or artificial neural networks, emulate computing systems inspired by biological neural networks found in animal brains. These systems exhibit learning capabilities, progressively enhancing their performance without requiring task-specific programming. For instance, in image recognition, a neural network can be trained to detect specific objects within images by analysing labelled example images. Once it grasps the correlation between objects and their names, it can apply this knowledge to identify similar objects in unlabelled images.

Fundamentally, a neural network consists of interconnected units known as neurons, connected by synapses that transmit signals of varying strengths. These signals travel unidirectionally, activating receiving neurons based on the strength of these connections. When the combined incoming signals, originating from multiple transmitting neurons, reach a certain threshold, the receiving neuron activates and transmits a signal to downstream neurons. This activation strength becomes a crucial parameter governing signal propagation within the network.

Moreover, during the training of a neural network architecture, regression—comprised of statistical processes for understanding variable relationships—can involve minimizing a cost function. This function gauges the network's performance in accurately linking training examples to their intended outputs. If, during training, this cost function value falls outside a predefined range based on known training data, a technique called backpropagation is employed. Backpropagation, a widely used method for training artificial neural networks, collaborates with optimization methods like stochastic gradient descent (SGD).

Moreover, use of backpropagation can include propagation and weight update. Backpropagation involves two key steps: propagation and weight adjustment. When an input enters the neural network, it moves forward through each layer until it reaches the output layer. Here, the neural network's output is measured against the desired output using a cost function, generating an error value for each output node. These errors then flow backward, starting from the output layer, assigning error values to each node based on its contribution to the final output. These error values are pivotal and they aid in computing the cost function's gradient concerning the neural network's weights. This gradient guides the selected optimization technique, adjusting the weights to minimize the cost function.

Accordingly, the embedding network itself comprises layers of neural network architecture, often employing techniques like convolutional layers, recurrent layers, or fully connected layers to learn and extract meaningful patterns from the input data. The embedding networks may be trained through processes like supervised learning, unsupervised learning, or self-supervised learning to optimize the embeddings for specific downstream tasks, such as classification, clustering, or recommendation.

In some embodiments, the various embedding networks are trained to generate embeddings in the same embedding space (the same multi-dimensional vector space) so that embeddings (generated by different embedding networks) that are contextually, spatially and/or temporally related point towards the same point within the multi-dimensional vector space. The term "point towards the same point within the multi-dimensional vector space" should in the present context be interpreted broadly, and encompass "point in substantially the same direction within the multi-dimensional vector space" or "point towards substantially the same point within the multi-dimensional vector space" and so forth. In more detail, having two embedding vectors pointing towards the same point or in the same direction, one can infer a relationship between the two underlying data samples. For example, if one has two embedding vectors, one can calculate how close they are to pointing towards the same point or how close they are to pointing in the same direction in order to determine a relationship between the underlying data samples, where the closer they are to pointing towards the same point or the same direction, the more likely it is that the underlying data samples relate to the same object or scene.

This may for example be done by training a first embedding network, to generate embeddings in a multi-dimensional vector space, based on input data from a first data source. Then, each of the other embedding networks are trained "against" or in association with the first embedding network so that the embeddings of the other networks that are contextually, spatially and/or temporally related with the embeddings of the first embedding network point towards the same point within the multi-dimensional vector space as the related embeddings of the first embedding network. For example, if the first embedding network is trained to generate image embeddings for camera images and a second embedding network is intended to generate embeddings for Lidar data, then the second embedding network may be trained by feeding the second embedding network with lidar data of a scene where corresponding image embeddings (of that scene) will be used as basis for forming a ground-truth (desired output). By doing this process for each subsequent embedding network one may obtain a set of embedding networks capable of ingesting outputs from various data sources and output corresponding embeddings where contextual, spatial and/or temporal relations are represented by the proximity or similarly in direction of the embeddings (vectors) in the multi-dimensional vector space.

FIG. 1 is a schematic flowchart representation of a method S100 for setting dynamic triggers for event recordings for a vehicle. The method S100 is preferably a computer-implemented method S100, performed by a processing system of the vehicle. The processing system may for example comprise one or more processors and one or more memories coupled to the one or more processors, wherein the one or more memories store one or more programs that perform the steps, services and functions of the method S100 disclosed herein when executed by the one or more processors. The vehicle comprises one or more sensors configured to collect information about a surrounding environment of the vehicle (e.g., cameras, RADAR devices, LiDAR devices, etc), and optionally, information about the vehicle itself (e.g., Inertial Measurement Unit (IMU), accelerometers, Global Navigation Satellite System (GNSS), etc.).

The method S100 comprises obtaining S101 sensor data samples captured by one or more sensors of the vehicle. In some embodiments, the method S100 comprises collecting sensor data samples from a received S107 sensor data stream that is output from one or more sensors of the vehicle. The obtained S101 or otherwise collected S101 sensor data samples may be stored S108 in a data buffer. The data buffer may be of a suitable size or length depending on specific realizations. In more detail, the sensor data buffer may be of any size deemed suitable, e.g. in consideration of data capacity restraints and/or characteristics of the sensor data samples, and may for instance range from under a second up to several minutes, or more preferred, from a few seconds up to less than a minute. For example, the data buffer may be configured to store 5 to 20 seconds of the sensor data stream (that is sampled with a set sample rate such as e.g., 10 Hz, 20 Hz, 30 Hz, 40 Hz, etc.), in a First-In First-Out (FIFO) arrangement. However, in some embodiments the data buffer may be configured to store between 30 seconds and 60 seconds of the sensor data stream. This may provide the advantage of being able to capture an entire scenario's development over time.

The term "obtaining" is herein to be interpreted broadly and encompasses receiving, retrieving, collecting, acquiring, and so forth directly and/or indirectly between two entities or components configured to be in communication with each other or further with other external entities. However, in some embodiments, the term "obtaining" is to be construed as determining, deriving, forming, computing, etc. In other words, obtaining a pose of the vehicle may encompass determining or computing a pose of the vehicle based on e.g. GNSS data and/or perception data together with map data. Thus, as used herein, "obtaining" may indicate that a parameter is received at a first entity/unit from a second entity/unit, or that the parameter is determined at the first entity/unit e.g. based on data received from another entity/unit.

Further, the method S100 comprises generating S102 sensor data embeddings from the obtained S101 sensor data samples. Moreover, the sensor data embeddings are generated S102 by processing each sensor data sample through one or more sensor data embedding networks that has/have been trained to process sensor data samples and to output a corresponding sensor data embedding for each sensor data sample in a multi-dimensional vector space.

In some embodiments, the one or more sensor data embedding networks comprise a plurality of sensor data embedding networks including one sensor data embedding network for a corresponding/respective sensor of the vehicle. In other words, in some embodiments, the obtained S101 sensor data samples comprise sensor data samples output by two or more different sensors of the vehicle, and accordingly two or more corresponding sensor data embedding networks in a one-to-one ratio (i.e., each sensor data embedding network is related to one specific sensor of the vehicle). Moreover, the plurality of sensor data embedding networks may comprise a first sensor data embedding network trained to process sensor data samples of a first sensor and to output a corresponding sensor data embedding (for each sensor data sample output by the first sensor). Moreover, each of the other sensor data embedding networks (i.e., a second sensor data embedding network for a second sensor, a third sensor data embedding network for a third sensor, etc.) has been trained in association with the first sensor data embedding network such that a sensor embedding generated by the first sensor data embedding network and a sensor embedding generated by each of the other sensor data embedding networks point towards the same point within the multi-dimensional vector space when the two-sensor data embeddings are contextually, spatially and/or temporally related.

Moreover, in some embodiments, the method S100 further comprises storing the generated S103 sensor data embeddings in a data buffer. The data buffer may be of any suitable size as discussed in the foregoing with respect to the sensor data samples. In particular, the sensor data sample buffer and the sensor data embeddings buffer may be of the same size. Thereby, at any given time, the sensor data embeddings representing the sensor data samples collected during the last time period (e.g., the last 10 s, 20 s, or 30 s) are readily available.

The method S100 further comprises receiving S103 a query embedding, where the query embedding has been generated by processing a query through one or more query embedding networks that have been trained to process queries and to output a corresponding query embedding for each query in the multi-dimensional vector space. Moreover, each of the one or more query embedding networks have been trained in association with one or more of the sensor data embedding networks such that a query embedding of a query that is contextually related to a specific sensor data sample points towards the same point as the sensor data embedding of that sensor data sample within the multi-dimensional vector space. In some embodiments, the system has multiple query embeddings networks, e.g., one for every input type such as e.g., free-text input, image input or video input. However, in some embodiments a single, larger, query embedding network may be employed capable of handling queries of different input formats, where the different types of queries may be ingested separately or in combined fashion.

Accordingly, some embodiments herein propose an architecture where one sensor data embedding network serves as a basis for training the query embedding network(s). In more detail, once a sensor data embedding network has been trained to generate sensor data embeddings, one can train a query embedding network against the sensor data embedding network so that the generated query embeddings that are associated with a particular sensor data sample points towards the same point as the corresponding sensor data embedding of that particular sensor data sample in the multi-dimensional vector space. This can for example be done by creating training examples with training pairs of queries and corresponding sensor data samples as known in the art of machine learning. For example, a training pair could be the query "stop signs" and then sensor data samples (e.g., camera images) of stop signs are retrieved and their corresponding embeddings are used to form a ground truth for the query embedding network. Thereby one attains a connection between queries and the sensor data samples, and searching for specific sensor data samples with e.g., free text queries is enabled.

In some embodiments, the method S100 comprises receiving S114 a user query and generating the query embedding by processing the query through one or more query embedding networks that have been trained to process queries and to output a corresponding query embedding for each query in the multi-dimensional vector space.

The method S100 further comprises identifying S104*a* one or more sensor data embeddings within the multi-dimensional vector space based on a proximity to the received S103 query embedding within the multi-dimensional vector space. In some embodiments the identifying S104*a* of the one or more sensor data embeddings comprises identifying the one or more sensor data embeddings that are within a distance value (distance threshold) from the obtained query embedding within the multi-dimensional vector space. Accordingly, in some embodiments, the identification S104*a* of the relevant sensor data embeddings comprises comparing S106*a* the received S103 query embedding with sensor data embeddings within the multi-dimensional vector space in view of a distance metric in order to identify S104*a* the relevant sensor data embeddings.

The distance value (distance threshold) may be predefined. In some embodiments the distance value (distance threshold) is dynamically set. For example, the distance value (distance threshold) may be dynamically set by the user query directly or indirectly (e.g., metadata associated with the user query). In more detail, the query may include some operators or commands that define distance value (threshold) such as e.g., "small" (or "narrow"), "medium", "large" ("or "broad"). Alternatively, the operators or commands may be set in the metadata of the query (e.g., having interactable "boxes" in the User Interface, UI) through which the query is generated. The matching algorithm used in the identification S104a (and 104b) may then account for the operators or commands when searching for matching sensor data embeddings (and ADS data embeddings). Moreover, the term "within a distance value" may be construed as "fulfilling a distance metric", where the distance metric may be that the embeddings that are selected are the embeddings that are within a Euclidian/Manhattan/Cosine distance value (e.g., distance threshold) from the query embedding.

The method S100 further comprises storing S105a (at least a subset of) sensor data samples represented by the identified S104a one or more sensor data embeddings. In some embodiments, the storing S105a of the subset of sensor data samples comprises persistently storing the subset of sensor data samples represented by the identified one or more sensor data embeddings in a data storage unit. The persistent storage is in contrast to the previously described buffered storage of sensor data samples and sensor data embeddings, which is to be construed as temporary storage.

Further, in some embodiments, the method S100 further comprises transmitting S109a the stored S105a sensor data samples to a remote server (e.g., a cloud environment). Accordingly, the vehicle may be provided with suitable communications capability to transmit the stored S105a sensor data using any suitable communications protocol as known in the art.

Further, in some embodiments, the vehicle comprises an Automated Driving System (ADS) configured to generate ADS output data samples. The ADS output data samples may for example be output generated by one or more "downstream functions" of the ADS, such as perception functions (e.g., object detection, object classification, semantic segmentation, free-space estimation, object tracking, etc.), path planning functions, trajectory planning functions, road model generation functions, localization functions, and so forth.

Accordingly, the method S100 may comprise obtaining S110 ADS output data samples. As with the sensor data samples, the method S100 may comprise collecting ADS data samples from a received S111 ADS output data stream that is output from one or more ADS functions of the ADS. The obtained S110 or otherwise collected S110 ADS output data samples may be stored S112 in a data buffer. As before, the data buffer may be of a suitable size or length depending on specific realizations. In more detail, the ADS output data buffer may be of any size deemed suitable, e.g. in consideration of data capacity restraints and/or characteristics of the ADS output data samples, and may for instance range from under a second up to several minutes, or more preferred, from a few seconds up to less than a minute.

Further, the method S100 may comprise generating S113 ADS data embeddings from the obtained S110 ADS output data samples. In more detail, ADS data embeddings may be generated by processing each ADS output data sample through one or more ADS data embedding networks that are trained to process ADS output data samples and to output a corresponding ADS data embedding in the multi-dimensional vector space. Moreover, each of the one or more ADS data embedding networks are trained in association with one or more of the sensor data embedding networks such that an ADS data embedding of an ADS output data sample that is contextually, spatially and/or temporally related to a specific sensor data sample points towards the same point as the sensor data embedding of that sensor data sample within the multi-dimensional vector space.

In some embodiments, the one or more ADS data embedding networks may be a plurality of ADS output networks. In other words, in some embodiments, the obtained S110 ADS output data samples comprise ADS output data samples output by two or more different ADS functions of the ADS. Accordingly, two or more corresponding ADS data embedding networks in a one-to-one ratio (i.e., each ADS data embedding network is related to one specific ADS function of the ADS). As with the query embedding network (s), the ADS embedding network(s) may be trained "against" a base network in the form of a sensor data embedding network.

The method S100 may further comprise identifying S104b one or more ADS data embeddings within the multi-dimensional vector space based on a proximity to the received query embedding within the multi-dimensional vector space. In some embodiments the identifying S104b of the one or more ADS data embeddings comprises identifying the one or more ADS data embeddings that are within a distance value (distance threshold) from the obtained query embedding within the multi-dimensional vector space. Accordingly, in some embodiments, the identification S104b of the relevant ADS data embeddings comprises comparing S106b the received S103 query embedding with ADS data embeddings within the multi-dimensional vector space in view of a distance metric in order to identify S104b the relevant ADS data embeddings. As before, the distance value (distance threshold) may be predefined. In some embodiments the distance value (distance threshold) is dynamically set. For example, the distance value (distance threshold) may be dynamically set by the user query directly or indirectly (e.g., metadata associated with the user query).

Further, the method S100 may comprise storing S105b (at least a subset of the) ADS output data samples represented by the identified one or more ADS data embeddings. Moreover, the method S100 may comprise transmitting S109b the stored S105b ADS output data samples to a remote server.

It should be noted that identification S104a sensor data embeddings and the identification S104b of ADS data embeddings have been illustrated as parallel streams in FIG. 1, it is not limited thereto. As the embeddings are represented in a common vector space, the search for relevant embeddings (regardless of being sensor data embeddings or ADS data embeddings) in view of the query embedding can be performed in the same process step. In other words, when one obtains S103 a query embedding (e.g., a text-based embedded query vector), and the sensor-specific embedding networks have generated the corresponding sensor data embeddings, one can either sum these sensor data embeddings and compare the query embedding to the summed sensor data embeddings (to get a summed query-comparison-score), or compare the query embedding to each of the sensor-specific embeddings (to get sensor-specific query-comparison-scores) and then sum the scores to get the summed query-comparison-score.

Executable instructions for performing these functions are, optionally, included in a non-transitory computer-readable storage medium or other computer program product configured for execution by one or more processors.

Figure 2:
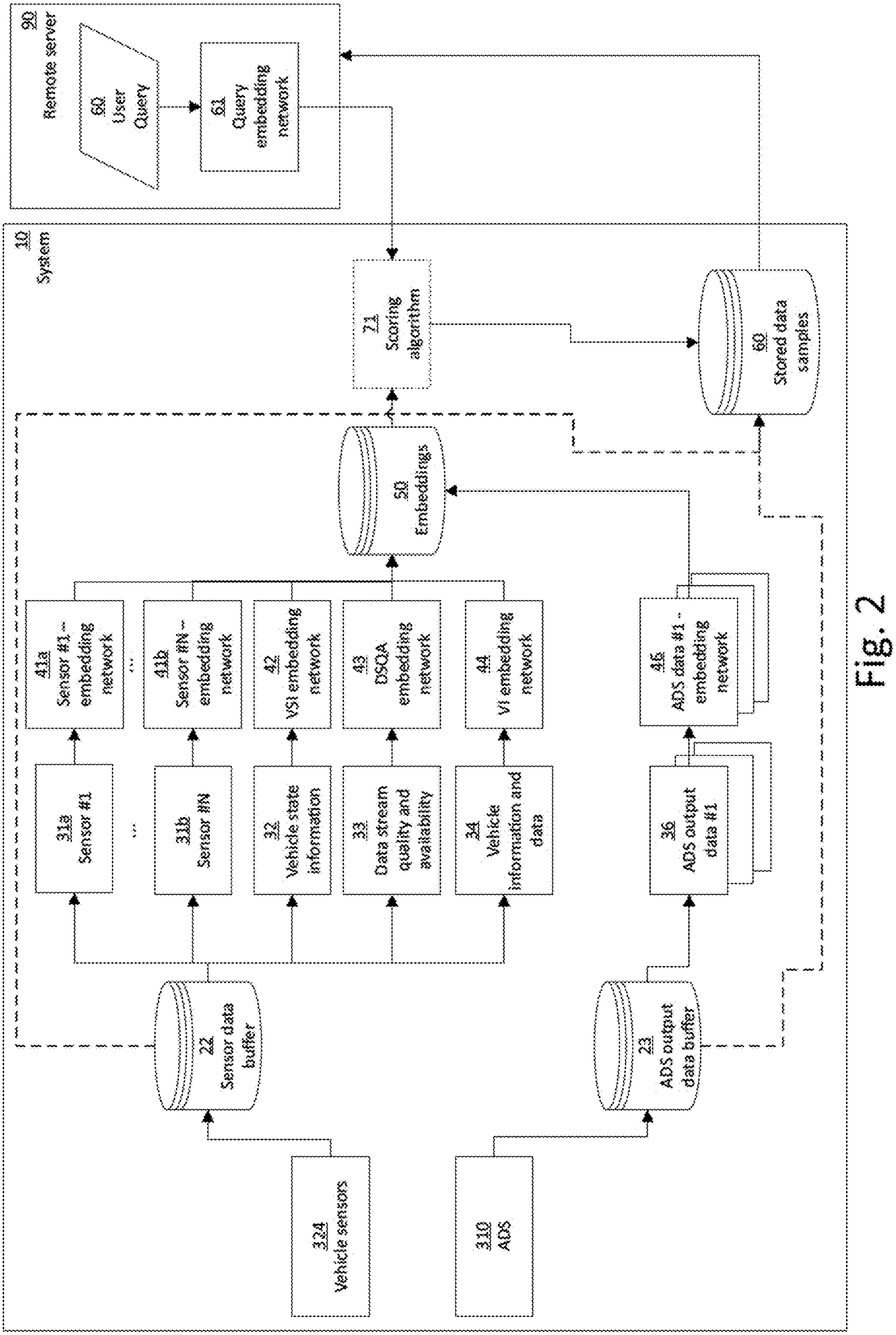
FIG. 2 is a schematic block diagram representation of a system for setting dynamic triggers for event recordings for a vehicle in accordance with some embodiments.

FIG. 2 is a schematic block diagram representation of a system 10 for setting dynamic triggers for event recordings for a vehicle. The system 10 comprises control circuitry 11 (e.g. one or more processors—see FIG. 3) configured to perform the functions of the method S100 disclosed herein, where the functions may be included in a non-transitory computer-readable storage medium 12 or other computer program product configured for execution by the control circuitry 11. In other words, the system 10 comprises one or more memory storage areas 12 comprising program code, the one or more memory storage areas 12 and the program code configured to, with the one or more processors 11, cause the system 10 to perform the method S100 according to any one of the embodiments disclosed herein. However, in order to better elucidate the herein disclosed embodiments, the control circuitry is represented as various "modules" or blocks in FIG. 2, each of them linked to one or more specific functions of the control circuitry 11.

In more detail, FIG. 2 depicts the data flow to and within the system 10 for setting dynamic triggers for event recordings for a vehicle 1. In the depicted embodiment, the system 10 depicts a run-time solution, where the processes discussed in the foregoing are executed while the vehicle is operating. However, as readily understood by the skilled artisan, the same principles are applicable in an offline solution with some minor modifications (e.g., replacing the sensor data buffer and ADS output data buffer with data repositories storing larger datasets).

The control circuitry 11 is accordingly configured to obtain sensor data samples (e.g., from a sensor data buffer 22) captured by one or more sensors 324 of the vehicle 1. Accordingly, the output from one or more sensors 324 of the vehicle 1 may be temporarily stored or "buffered" in a suitable data buffer. Further, the control circuitry is configured to generate sensor data embeddings from the sensor data samples. The sensor data embeddings are generated by processing each sensor data sample through one or more sensor data embedding networks 41*a*, 41*b* that have been trained to process sensor data samples and to output a corresponding sensor data embedding for each sensor data sample in a multi-dimensional vector space. Just as for the sensor data samples, the sensor data embeddings may be stored in a corresponding data buffer 50.

The system 10 may comprise multiple sensor data embedding networks 41*a*, 41*b*, one for each specific sensor 31*a*, 31*b*. For example, the system may comprise one embedding network for a first camera of the vehicle, one embedding network for a second camera of the vehicle, one embedding network for a lidar of the vehicle, and so forth. Furthermore, the system 10 may comprise additional embedding networks 42, 43, 44 for other data types, such as e.g., vehicle state information ("VSI"), data stream quality and availability 33, and vehicle information and data 34. In more detail, the vehicle state information may include a position, heading, and/or speed of the vehicle, the data stream quality and availability may comprise quality and availability parameters of the output from the sensors 324. The vehicle information and data may comprise vehicle model, ADS software version, and so forth. However, in some embodiments, the other data types 32-34 may in come embodiments be included as metadata in the sensor data samples and therefore be incorporated in the sensor data embeddings.

Further, the control circuitry 11 is configured to receive a query embedding (e.g., from a remote server 90). Here, the query embedding has been generated by processing a query 60 through one or more query embedding networks 61 that have been trained to process queries 60 and to output a corresponding query embedding for each query in the multi-dimensional vector space. Moreover, each of the one or more query embedding networks 61 have been trained in association with one or more of the sensor data embedding networks 41*a*, 41*b* such that a query embedding of a query 60 that is contextually related to a specific sensor data sample points towards the same point as the sensor data embedding of that sensor data sample within the multi-dimensional vector space.

In some embodiments, the control circuitry is configured to receive a user query 60, and to generate generating the query embedding by processing the query through one or more query embedding networks 61 that have been trained to process queries and to output a corresponding query embedding for each query in the multi-dimensional vector space. In other words, the query embedding network 90 may be part of the system 10 rather than the remote server 90 in some embodiments.

Further, the control circuitry 11 is configured to identify one or more sensor data embeddings within the multi-dimensional vector space based on a proximity to the received query embedding within the multi-dimensional vector space. The control circuitry 11 may be configured to identify the one or more sensor data within the multi-dimensional vector space by identifying the one or more sensor data embeddings that are within a distance value from the obtained query embedding within the multi-dimensional vector space. As before, the term "that are within a distance value" may be construed as "that fulfil a distance metric". This is represented by a scoring algorithm block 71 of the system 10 in FIG. 2, where the matching/scoring algorithm is configured to score embeddings based on their relevancy as defined by the distance values from the query embedding. Some suitable distance metrics that may be used are Euclidian Distance, Manhattan Distance, or Cosine distance.

Further, the control circuitry 11 may be configured to store (at least a subset of the) sensor data samples represented by the identified one or more sensor data embeddings, in e.g., a persistent data store 60 or data storage unit 60. In some embodiments, the control circuitry 11 is configured to transmit the stored sensor data samples to a remote server, using a communication system 326 of the vehicle 1.

In other words, once the query embedding is received or otherwise obtained, its "position" in the multi-dimensional vector space is evaluated, and the relevant sensor data embeddings are retrieved based on their proximity to the query embedding. For example, any sensor data embeddings that are within a Euclidian/Manhattan/Cosine distance vale (distance threshold) from the query embedding are selected as relevant embeddings, and their linked sensor data samples are accordingly stored.

Further, in some embodiments, the vehicle comprises an Automated Driving System (ADS) 310 configured to generate ADS output data samples. The ADS output data samples may for example be output generated by one or more "downstream functions" 312, 314, 316, 318 of the ADS, such as perception functions 314 (e.g., object detection, object classification, semantic segmentation, free-space estimation, object tracking, etc.), path planning functions 316, trajectory planning functions, road model generation functions, localization functions 312, and so forth.

Thus, in some embodiments, the control circuitry 11 is configured to obtain ADS output data samples. As with the sensor data samples, the control circuitry may be configured to collect. ADS data samples from an ADS output data stream that is output from one or more ADS functions of the ADS 310. The obtained or otherwise collected ADS output data samples may be stored in a data buffer 23. As before, the data buffer 23 may be of a suitable size or length depending on specific realizations. In more detail, the ADS output data buffer 23 may be of any size deemed suitable, e.g. in consideration of data capacity restraints and/or characteristics of the ADS output data samples, and may for instance range from under a second up to several minutes, or more preferred, from a few seconds up to less than a minute.

Further, the control circuitry 11 may be configured to generate ADS data embeddings from the ADS output data samples. In more detail, the ADS data embeddings may be generated by processing each ADS output data sample through one or more ADS data embedding networks 46 that are trained to process ADS output data samples and to output a corresponding ADS data embedding in the multi-dimensional vector space. Moreover, each of the one or more ADS data embedding networks 46 are trained in association with one or more of the sensor data embedding networks 41*a*, 41*b* such that an ADS data embedding of an ADS output data sample that is contextually, spatially and/or temporally related to a specific sensor data sample points towards the same point as the sensor data embedding of that sensor data sample within the multi-dimensional vector space.

In some embodiments, the one or more ADS data embedding networks 46 may be a plurality of ADS output networks 46. In other words, in some embodiments, the obtained ADS output data samples comprise ADS output data samples output by two or more different ADS functions of the ADS. Accordingly, two or more corresponding ADS data embedding networks in a one-to-one ratio (i.e., each ADS data embedding network is related to one specific ADS function of the ADS). This is indicated in FIG. 2 by having each specific type of ADS output data samples 36 to be provided as input to a corresponding ADS data embedding network 46. As with the query embedding network(s), the ADS embedding network(s) 46 may be trained "against" a base network in the form of a sensor data embedding network 41*a*.

Further, the control circuitry 11 may be configured to identify one or more ADS data embeddings within the multi-dimensional vector space based on a proximity to the received query embedding within the multi-dimensional vector space. In some embodiments the control circuitry 11 is configured to identify the one or more ADS data embeddings by identifying the one or more ADS data embeddings that are within a distance value (distance threshold) from the obtained query embedding within the multi-dimensional vector space. Accordingly, in some embodiments, the control circuitry is configured to embeddings compare the received query embedding with ADS data embeddings (as stored in the embeddings buffer 50) within the multi-dimensional vector space in view of a distance metric in order to identify the relevant ADS data embeddings. As before, the distance value (distance threshold) may be predefined. In some embodiments the distance value (distance threshold) is dynamically set. For example, the distance value (distance threshold) may be dynamically set by the user query directly or indirectly (e.g., metadata associated with the user query). The control circuitry 11 may be further configured to store (at least a subset of the) ADS output data samples represented by the identified one or more ADS data embeddings, e.g., in a suitable data store 60. Similar as before, the control circuitry 11 may be configured to transmit the stored ADS output data samples to the remote server 90.

Figure 3:
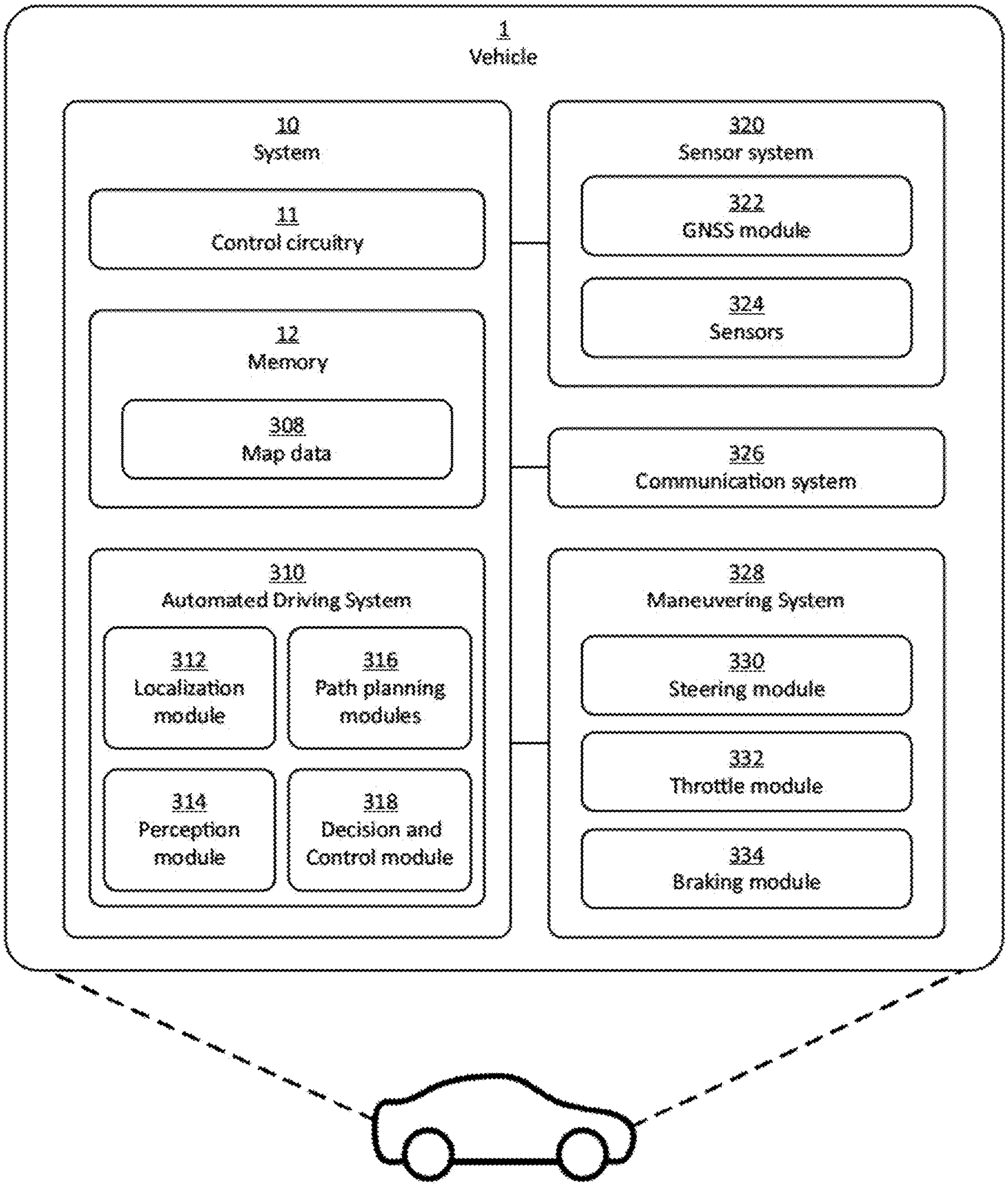
FIG. 3 is a schematic illustration of a vehicle comprising a system for setting dynamic triggers for event recordings for a vehicle in accordance with some embodiments.

FIG. 3 is a schematic illustration of an ADS-equipped vehicle 1 comprising such a system 10. As used herein, a "vehicle" is any form of motorized transport. For example, the vehicle 1 may be any road vehicle such as a car (as illustrated herein), a motorcycle, a (cargo) truck, a bus, etc.

The system 10 comprises control circuitry 11 and a memory 12. The control circuitry 11 may physically comprise one single circuitry device. Alternatively, the control circuitry 11 may be distributed over several circuitry devices. As an example, the apparatus 10 may share its control circuitry 11 with other parts of the vehicle 1 (e.g. the ADS 310). Moreover, the system 10 may form a part of the ADS 310, i.e. the system 10 may be implemented as a module or feature of the ADS. The control circuitry 11 may comprise one or more processors, such as a central processing unit (CPU), microcontroller, or microprocessor. The one or more processors may be configured to execute program code stored in the memory 12, in order to carry out various functions and operations of the vehicle 1 in addition to the methods disclosed herein. The processor(s) may be or include any number of hardware components for conducting data or signal processing or for executing computer code stored in the memory 12. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The memory 12 may include database components, object code components, script components, or any other type of information structure for supporting the various activities of the present description.

In the illustrated example, the memory 12 further stores map data 308. The map data 308 may for instance be used by the ADS 310 of the vehicle 1 in order to perform autonomous functions of the vehicle 1. The map data 308 may comprise high-definition (HD) map data. It is contemplated that the memory 12, even though illustrated as a separate element from the ADS 310, may be provided as an integral element of the ADS 310. In other words, according to an exemplary embodiment, any distributed or local memory device may be utilized in the realization of the present inventive concept. Similarly, the control circuitry 11 may be distributed e.g. such that one or more processors of the control circuitry 11 is provided as integral elements of the ADS 310 or any other system of the vehicle 1. In other words, according to an exemplary embodiment, any distributed or local control circuitry device may be utilized in the realization of the present inventive concept. The ADS 310 is configured carry out the functions and operations of the autonomous or semi-autonomous functions of the vehicle 1. The ADS 310 can comprise a number of modules, where each module is tasked with different functions of the ADS 310.

The vehicle 1 comprises a number of elements which can be commonly found in autonomous or semi-autonomous vehicles. It will be understood that the vehicle 1 can have any combination of the various elements shown in FIG. 3. Moreover, the vehicle 1 may comprise further elements than those shown in FIG. 3. While the various elements is herein shown as located inside the vehicle 1, one or more of the elements can be located externally to the vehicle 1. For example, the map data may be stored in a remote server and accessed by the various components of the vehicle 1 via the communication system 326. Further, even though the various elements are herein depicted in a certain arrangement, the various elements may also be implemented in different arrangements, as readily understood by the skilled person. It should be further noted that the various elements may be communicatively connected to each other in any suitable way. The vehicle 1 of FIG. 3 should be seen merely as an illustrative example, as the elements of the vehicle 1 can be realized in several different ways.

The vehicle 1 further comprises a sensor system 320. The sensor system 320 is configured to acquire sensory data about the vehicle itself, or of its surroundings. The sensor system 320 may for example comprise a Global Navigation Satellite System (GNSS) module 322 (such as a GPS) configured to collect geographical position data of the vehicle 1. The sensor system 320 may further comprise one or more sensors 324. The sensor(s) 324 may be any type of on-board sensors, such as cameras, LiDAR devices and RADAR devices, ultrasonic sensors, gyroscopes, accelerometers, odometers etc. It should be appreciated that the sensor system 320 may also provide the possibility to acquire sensory data directly or via dedicated sensor control circuitry in the vehicle 1.

The vehicle 1 further comprises a communication system 326. The communication system 326 is configured to communicate with external units, such as other vehicles (i.e. via vehicle-to-vehicle (V2V) communication protocols), remote servers (e.g. cloud servers), databases or other external devices, i.e. vehicle-to-infrastructure (V2I) or vehicle-to-everything (V2X) communication protocols. The communication system 318 may communicate using one or more communication technologies. The communication system 318 may comprise one or more antennas (not shown). Cellular communication technologies may be used for long range communication such as to remote servers or cloud computing systems. In addition, if the cellular communication technology used have low latency, it may also be used for V2V, V2I or V2X communication. Examples of cellular radio technologies are GSM, GPRS, EDGE, LTE, 5G, 5G NR, and so on, also including future cellular solutions. However, in some solutions mid to short range communication technologies may be used such as Wireless Local Area (LAN), e.g. IEEE 802.11 based solutions, for communicating with other vehicles in the vicinity of the vehicle 1 or with local infrastructure elements. ETSI is working on cellular standards for vehicle communication and for instance 5G is considered as a suitable solution due to the low latency and efficient handling of high bandwidths and communication channels.

The communication system 326 may accordingly provide the possibility to send output to a remote location (e.g. remote operator or control center) and/or to receive input from a remote location by means of the one or more antennas. Moreover, the communication system 326 may be further configured to allow the various elements of the vehicle 1 to communicate with each other. As an example, the communication system may provide a local network setup, such as CAN bus, I2C, Ethernet, optical fibers, and so on. Local communication within the vehicle may also be of a wireless type with protocols such as Wi-Fi®, LoRa, Zigbee, Bluetooth, or similar mid/short range technologies.

The vehicle 1 further comprises a maneuvering system 320. The maneuvering system 328 is configured to control the maneuvering of the vehicle 1. The maneuvering system 328 comprises a steering module 330 configured to control the heading of the vehicle 1. The maneuvering system 328 further comprises a throttle module 332 configured to control actuation of the throttle of the vehicle 1. The maneuvering system 328 further comprises a braking module 334 configured to control actuation of the brakes of the vehicle 1. The various modules of the maneuvering system 328 may also receive manual input from a driver of the vehicle 1 (i.e. from a steering wheel, a gas pedal and a brake pedal respectively). However, the maneuvering system 328 may be communicatively connected to the ADS 310 of the vehicle, to receive instructions on how the various modules of the maneuvering system 328 should act. Thus, the ADS 310 can control the maneuvering of the vehicle 1, for example via the decision and control module 318.

The ADS 310 may comprise a localization module 312 or localization block/system. The localization module 312 is configured to determine and/or monitor a geographical position and heading of the vehicle 1, and may utilize data from the sensor system 320, such as data from the GNSS module 322. Alternatively, or in combination, the localization module 312 may utilize data from the one or more sensors 324. The localization system may alternatively be realized as a Real Time Kinematics (RTK) GPS in order to improve accuracy.

The ADS 310 may further comprise a perception module 314 or perception block/system 314. The perception module 314 may refer to any commonly known module and/or functionality, e.g. comprised in one or more electronic control modules and/or nodes of the vehicle 1, adapted and/or configured to interpret sensory data-relevant for driving of the vehicle 1—to identify e.g. obstacles, vehicle lanes, relevant signage, appropriate navigation paths etc. The perception module 314 may thus be adapted to rely on and obtain inputs from multiple data sources, such as automotive imaging, image processing, computer vision, and/or in-car networking, etc., in combination with sensory data e.g. from the sensor system 320.

The localization module 312 and/or the perception module 314 may be communicatively connected to the sensor system 320 in order to receive sensory data from the sensor system 320. The localization module 312 and/or the perception module 314 may further transmit control instructions to the sensor system 320.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the system 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to some embodiments embodiment the memory 12 is communicably connected to the processor 11 (e.g., via a circuit or any other wired, wireless, or network connection) and includes computer code for executing one or more processes described herein.

It should be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various obtaining, receiving, transmitting, generating, storing, comparing, identifying steps. The above mentioned and described embodiments are only given as examples and should not be limiting to the present invention. Other solutions, uses, objectives, and functions within the scope of the invention as claimed in the below described patent claims should be apparent for the person skilled in the art.

The invention claimed is:

1. A method performed by a processing system of a vehicle for setting dynamic triggers for event recordings for the vehicle, the method comprising:

receiving a sensor data stream that is output from one or more sensors of the vehicle;

obtaining sensor data samples from the sensor data stream and temporarily storing the sensor data samples in a sensor data buffer;

continuously generating sensor data embeddings from the sensor data samples and temporarily storing the generated sensor data embeddings in an embeddings buffer, wherein the sensor data embeddings are generated by processing each sensor data sample through one or more sensor data embedding networks that are trained to process sensor data samples and to output a corresponding sensor data embedding for each sensor data sample in a multi-dimensional vector space;

receiving a query embedding, wherein the query embedding has been generated by processing a query through one or more query embedding networks that are trained to process queries and to output a corresponding query embedding for each query in the multi-dimensional vector space, and wherein each of the one or more query embedding networks is trained in association with one or more of the sensor data embedding networks such that a query embedding of a query that is contextually related to a specific sensor data sample points towards the same point as the sensor data embedding of that sensor data sample within the multi-dimensional vector space;

identifying one or more sensor data embeddings within the multi-dimensional vector space based on a proximity to the received query embedding within the multi-dimensional vector space; and persistently storing sensor data samples represented by the identified one or more sensor data embeddings in a data storage unit.

2. The method according to claim 1, wherein the one or more sensor data embedding networks comprise a plurality of sensor data embedding networks including one sensor data embedding network for a corresponding sensor of the vehicle, wherein the plurality of sensor data embedding networks comprises a first sensor data embedding network trained to process sensor data samples of a first sensor and to output a corresponding sensor data embedding, and wherein each of the other sensor data embedding networks is trained in association with the first sensor data embedding network such that a sensor data embedding generated by the first sensor data embedding network and a sensor data embedding generated by each of the other sensor data embedding networks point towards the same point within the multi-dimensional vector space when the generated sensor data embeddings are contextually, spatially and/or temporally related.

3. The method according to claim 1, wherein the identifying of the one or more sensor data embeddings comprises identifying the one or more sensor data embeddings that are within a distance value from the obtained query embedding within the multi-dimensional vector space.

4. The method according to claim 1, further comprising:

transmitting the stored sensor data samples to a remote server.

5. The method according to claim 1, wherein the vehicle comprises an automated driving system, ADS, configured to generate ADS output data samples, the method further comprising:

generating ADS data embeddings from the ADS output data samples, wherein the ADS data embeddings are generated by processing each ADS output data sample through one or more ADS data embedding networks that are trained to process ADS output data samples and to output a corresponding ADS data embedding in the multi-dimensional vector space, and wherein each of the one or more ADS data embedding networks are trained in association with one or more of the sensor data embedding networks such that an ADS data embedding of an ADS output data sample that is contextually, spatially and/or temporally related to a specific sensor data sample points towards the same point as the sensor data embedding of that sensor data sample within the multi-dimensional vector space;

identifying one or more ADS data embeddings within the multi-dimensional vector space based on a proximity to the received query embedding within the multi-dimensional vector space; and persistently storing ADS output data samples represented by the identified one or more ADS data embeddings in a data storage unit.

6. A non-transitory computer-readable storage medium storing instructions which, when executed by a computer, causes the computer to carry out the method according to claim 1.

7. An in-vehicle system for setting dynamic triggers for event recordings for a vehicle, the system comprising control circuitry configured to:

receive a sensor data stream that is output from one or more sensors of the vehicle;

obtain sensor data samples, from the sensor data stream, and temporarily storing the sensor data samples in a sensor data buffer of the vehicle;

continuously generate sensor data embeddings from the sensor data samples and temporarily store the generated sensor data embeddings in an embeddings buffer, wherein the sensor data embeddings are generated by processing each sensor data sample through one or more sensor data embedding networks that are trained to process sensor data samples and to output a corresponding sensor data embedding for each sensor data sample in a multi-dimensional vector space;

receive a query embedding, wherein the query embedding has been generated by processing a query through one or more query embedding networks that are trained to process queries and to output a corresponding query embedding for each query in the multi-dimensional vector space, and wherein each of the one or more query embedding networks is trained in association with one or more of the sensor data embedding networks such that a query embedding of a query that is contextually related to a specific sensor data sample points towards the same point as the sensor data embedding of that sensor data sample within the multi-dimensional vector space;

identify one or more sensor data embeddings within the multi-dimensional vector space based on a proximity to the received query embedding within the multi-dimensional vector space; and persistently store sensor data samples represented by the identified one or more sensor data embeddings in a data storage unit.

8. The system according to claim 7, wherein the one or more sensor data embedding networks comprise a plurality of sensor data embedding networks including one sensor data embedding network for a corresponding sensor of the vehicle, wherein the plurality of sensor data embedding networks comprises a first sensor data embedding network trained to process sensor data samples of a first sensor and to output a corresponding sensor data embedding, and wherein each of the other sensor data embedding networks is trained in association with the first sensor data embedding network such that a sensor data embedding generated by the first sensor data embedding network and a sensor data embedding generated by each of the other sensor data embedding networks point towards the same point within the multi-dimensional vector space when the generated sensor data embeddings are contextually, spatially and/or temporally related.

9. The system according to claim 7, wherein the vehicle comprises an automated driving system, ADS, configured to generate ADS output data samples, the control circuitry being further configured to:

generate ADS data embeddings from the ADS output data samples, wherein the ADS data embeddings are generated by processing each ADS output data sample through one or more ADS data embedding networks that are trained to process ADS output data samples and to output a corresponding ADS data embedding in the multi-dimensional vector space, and wherein each of the one or more ADS data embedding networks are trained in association with one or more of the sensor data embedding networks such that an ADS data embedding of an ADS output data sample that is contextually, spatially and/or temporally related to a specific sensor data sample points towards the same point as the sensor data embedding of that sensor data sample within the multi-dimensional vector space;

identify one or more ADS data embeddings within the multi-dimensional vector space based on a proximity to the received query embedding within the multi-dimensional vector space; and persistently store ADS output data samples represented by the identified one or more ADS data embeddings in a data storage unit.

10. A vehicle comprising a system according to claim 7.

* * * * *